US012503205B2

United States Patent
Brown et al.

(10) Patent No.: US 12,503,205 B2
(45) Date of Patent: Dec. 23, 2025

(54) METHODS AND SYSTEMS FOR DIAGNOSING MAINTENANCE NEEDS OF A SEA-GOING VESSEL

(71) Applicant: SHELL USA, INC., Houston, TX (US)

(72) Inventors: Stephen Andrew Brown, London (GB); Mark Robert Friswell, London (GB)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 18/683,261

(22) PCT Filed: Aug. 23, 2022

(86) PCT No.: PCT/EP2022/073430
§ 371 (c)(1),
(2) Date: Feb. 13, 2024

(87) PCT Pub. No.: WO2023/030958
PCT Pub. Date: Mar. 9, 2023

(65) Prior Publication Data
US 2025/0136256 A1    May 1, 2025

(30) Foreign Application Priority Data

Sep. 2, 2021 (EP) .................................... 21194583

(51) Int. Cl.
*B63B 79/30*     (2020.01)
*B63B 59/04*     (2006.01)
*B63B 81/00*     (2020.01)

(52) U.S. Cl.
CPC .............. *B63B 79/30* (2020.01); *B63B 59/04* (2013.01); *B63B 81/00* (2020.01)

(58) Field of Classification Search
None
See application file for complete search history.

(56) References Cited

U.S. PATENT DOCUMENTS 6,822,462 B1 * 11/2004 Staerzl .................... C23F 13/04
                                                               324/700
6,973,890 B1 * 12/2005 Staerzl .................... B63B 59/04
                                                               114/67 R (Continued)

FOREIGN PATENT DOCUMENTS

| WO | 2018027740 A  | 2/2018 |
| WO | 2018130905 A1 | 7/2018 |

(Continued)

OTHER PUBLICATIONS

International Search Report and Written Opinion received for PCT Patent Application No. PCT/EP2022/073430, mailed on Nov. 11, 2022, 11 Pages.

(Continued)

*Primary Examiner* — Redhwan K Mawari
(74) *Attorney, Agent, or Firm* — SHELL USA, INC.

(57) ABSTRACT

The disclosure provides a method for vessel maintenance optimization, the method comprising the steps of: obtaining operational data of the vessel; calculating a Torque Index; calculating a Slip Index; indicating that propeller cleaning is required if the Torque Index exceeds a Torque Index threshold, and indicating that hull cleaning is required if the Slip Index exceeds a Slip Index threshold.

11 Claims, 2 Drawing Sheets

(56) References Cited

U.S. PATENT DOCUMENTS

| | | | |
|---|---|---|---|
| 10,000,262 B2 | 6/2018 | Ando et al. | |
| 10,081,410 B2 | 9/2018 | Pyörre et al. | |
| 10,501,162 B2 | 12/2019 | Antola et al. | |
| 10,534,358 B2* | 1/2020 | Van Miert | B63B 79/15 |
| 10,543,886 B2* | 1/2020 | Van Miert | B63H 1/28 |
| 2009/0048726 A1 | 2/2009 | Lofall | |
| 2018/0304969 A1* | 10/2018 | Van Miert | B63J 99/00 |
| 2020/0363209 A1* | 11/2020 | Isojärvi | G01S 19/42 |
| 2021/0214057 A1 | 7/2021 | Tsujimoto | |

FOREIGN PATENT DOCUMENTS

| | | |
|---|---|---|
| WO | 2018182170 A1 | 10/2018 |
| WO | 2018182171 A1 | 10/2018 |
| WO | 2019243932 A1 | 12/2019 |

OTHER PUBLICATIONS

Logan, "Using a Ship's Propeller for Hull Condition Monitoring", Presented at ASNE Intelligent Ships Symposium IX, May 25, 2011, pp. 1-20.

Logan, "Using a Ship's Propeller for Hull Condition Monitoring", Naval Engineers Journal, Mar. 1, 2012, vol. No. 124, Issue No. 1, pp. 71-87.

Carchen et al., "Ship Performance Monitoring Dedicated to Biofouling Analysis: Development on a Small Size Research Catamaran", Applied Ocean Research, Aug. 2019, vol. No. 89, pp. 224-236.

Coraddu et al., "Data-driven Ship Digital Twin for Estimating the Speed Loss Caused by the Marine Fouling", Ocean Engineering, Jan. 28, 2019, pp. 1-39.

Dillon et al., "Abb Marine: Models of Vessel Hull and Propeller Fouling", MS-E2177 Seminar on Case Studies in Operations Research, Feb. 21, 2018, 9 Pages.

Coraddu et al., "A Novelty Detection Approach to Diagnosing Hull and Propeller Fouling", Ocean Engineering, Dec. 18, 2018, pp. 1-28.

Oliveira et al., "A Novel Indicator for Ship Hull and Propeller Performance: Examples From Two Shipping Segments", Ocean Engineering, 2020, vol. 205,16 Pages.

Caspar Website Downloads, Propulsion Dynamics, Aug. 27, 2019, 3 Pages.

ISO 19030-1, "Ships and Marine Technology—Measurement of Changes in Hull and Propeller Performance—Part 1: General Principles", International Standard, Nov. 15, 2016, 38 Pages.

ISO 19030-2, "Ships and Marine Technology—Measurement of Changes in Hull and Propeller Performance—Part 2: Default Method", International Standard, Nov. 15, 2016, 44 Pages.

ISO 19030-3, "Ships and Marine Technology—Measurement of Changes in Hull Andpropeller Performance—Part 3: Alternative Methods", International Standard, Nov. 15, 2016, 22 Pages.

* cited by examiner

METHODS AND SYSTEMS FOR DIAGNOSING MAINTENANCE NEEDS OF A SEA-GOING VESSEL

CROSS REFERENCE TO RELATED APPLICATIONS

This is a National stage application of International Application No. PCT/EP2022/073430, filed 23 Aug. 2022, which claims priority of European Application No. 21194583.7 filed 2 Sep. 2021 which is incorporated herein by reference in its entirety.

FIELD OF THE INVENTION

The present invention is directed to a method and a system for diagnosing maintenance needs of a sea-going vessel. The vessel may be a ship. The vessel may be a commercial vessel, for instance for carrying bulk cargo. The cargo may include, but is not limited to, one or more of crude oil, oil products, LNG, hydrogen, ISO containers, granular material, etc.

BACKGROUND OF THE INVENTION

Large ocean-going vessels are typically subject to refit activity, for instance every five years, at which time the underwater areas are painted and the propeller is polished. The performance of a vessel deteriorates over the course of the five-year period. The rate and degree of deterioration is dependent on several factors, but a crucial influence, and one which can be influenced, is the choice of paint applied. The shipping industry has developed a standard, ISO 19030 for quantifying the performance in terms of speed loss for a given power. This methodology does not however take the final step needed to monetize the impact of performance deterioration.

The underwater coatings applied to ships have a limited design application life, for instance, of 5 years. There are proposals being circulated in the shipping industry to increase this to 7.5 years. A vessel whose underwater coating performance has degraded over time may require, for instance, up to 25% more power or 25% more fuel, to achieve the same speed when compared to the newly applied condition. This results in an overall fleet average fuel consumption which generally exceeds the "ideal" value, or best achievable value. The fuel consumption overall may, consistent in a large population of vessels, exceed the ideal value with about 9%.

In general, fleet management tends to assume that the speed required is fixed by voyage orders, hence the impact of performance deterioration is to increase the power demand, thereby increasing fuel consumption, cost and emissions. Managing fuel consumption can be done using Hull Resistance Index (HRI), which is typically based on ISO standard 19030. HRI takes the power to speed relationship to determine the increased power demand to maintain a required speed. This translates directly into additional fuel, cost and emissions, but does not attribute this deterioration to hull or propeller factors.

Cleaning the hull is generally significantly more costly than polishing only the propeller. Propeller polishing can be done relatively easily at shallow depth, while hull cleaning involves elaborate procedures and specialized equipment, especially for large vessels with drafts over a certain depth, for instance more than 10 meters. The ISO standard and the HRI are not able to distinguish whether deterioration is a result of hull or propeller issues. To mitigate, some operators carry out regular propeller polishing. Others, including Applicant's managed fleet, carry out propeller polishing on an ad hoc basis.

There are technologies that seek to be able to determine the deterioration of the propeller, some by mathematical means, and some by the fitment of a shaft thrust meter, which claims to accurately measure the thrust produced, thereby allowing the efficiency of the propeller to be determined directly. The capital expenditure (CAPEX) for these thrust measurement systems is however relatively high, so that to date uptake has been very slow as they are novel. It is in any case unrealistic to expect that a large scale thrust meter retrofit program will take place on existing tonnage, and the majority of vessels in Applicant's portfolio are Chartered, either on a long term or short-term basis, therefore a data-based approach is essential.

WO2019243932 discloses a method and device of detecting the fouling of a propeller mounted to a vessel and connected to a main engine providing power to the propeller. The method includes comparing the relation of revolutions per unit time of the propeller vs. time obtained during a coasting maneuver in actual conditions and a corresponding curve obtained while performing a coasting maneuver with the propeller with no fouling.

U.S. Pat. No. 10,543,886 discloses an exemplary method for a marine vessel having a propeller mounted to a rotatable shaft for converting rotative shaft power transferred from the shaft to the propeller into thrust to propel the marine vessel across water, includes obtaining measurement values that are descriptive of the shaft power, the thrust and speed through water of the marine vessel; separately estimating at least one of first excess shaft power caused by fouling of the propeller and second excess shaft power caused by fouling of the hull of the marine vessel; and issuing an indication of propeller cleaning in dependence of the first excess shaft power and hull cleaning in dependence of the second excess shaft power.

Despite the advantages and cost savings provided by the systems referenced above, the present disclosure aims to provide an alternative method and system providing further improvements.

SUMMARY OF THE INVENTION

Amongst other things, the present disclosure provides methods that improve vessel maintenance, hull cleaning and propeller cleaning, which can enable a reduction in fuel consumption beyond a desired level, such as 9%. In addition to increased performance with appropriate maintenance resulting in less fuel consumption, the methods described herein allow for the hull cleaning or maintenance needs to be assessed separate and independent from the propeller performance, which indicates any propeller cleaning and maintenance needs. The methods of the present disclosure provide options in vessel maintenance: (a) perform both hull cleaning and propeller polishing; (b) perform hull cleaning alone; or (c) propeller polishing alone. Knowing which type of maintenance is warranted reduces unnecessary costs that can result from performing both hull cleaning and propeller polishing when only propeller polishing is warranted, particularly when cleaning the hull is generally significantly more costly than polishing only the propeller.

The majority of cleaning methods will remove some paint film, and will leave some micro scratching of the cleaned surface, which acts to accelerate fouling post cleaning. Repeated hull cleaning during a refit cycle can remove excessive paint film thickness and result in a surface which cannot be maintained in a high performing condition other than by premature refit and repainting. The insight provided by this invention ensures that hull cleaning is only carried out when actually required due to fouling, thereby eliminating premature exhaustion of the paint.

In one aspect, the invention provides a computer-implemented method for diagnosing maintenance needs of a sea-going vessel, said vessel comprising a hull, a propellor, an engine, and a drive shaft connecting the engine to the propellor, the method comprising the steps of:

(a) calculating a Propeller Distance using equation (A):

$$\text{Propeller Distance} = (\text{Nominal Pitch}) * (\text{a number of less than 1, preferably in a range of 0.7 to 0.09}) * (\text{Observed RPM}) \quad (A)$$

wherein the Nominal Pitch is a value indicating a pitch at 0.7 radius;

wherein the Observed RPM is a value indicating revolutions per minute of the drive shaft over a selected period;

(b) calculating a Slip Factor using equation (B):

$$\text{Slip Factor} = (\text{Propeller Distance})/(\text{Observed Distance}) \quad (B)$$

wherein the Observed Distance is an observed distance travelled by the vessel over the selected period;

(c) outputting at least one of: a Propeller Polishing Indicator and Hull Cleaning Indicator, where the Propeller Polishing Indicator is outputted as a separate value from the Hull Cleaning Indicator.

The step of outputting the Propeller Polishing Indicator comprises:

calculating a Reference Torque Multiplier using equation (C):

$$\text{Reference Torque Multiplier} = \quad (C)$$
$$(\text{a number of less than 1, preferably in a range from } 0.8 \text{ and up to } 0.09) * (\text{Rated Engine Power})/(\text{Rated RPM})^3$$

wherein the Rated Engine Power is a maximum power output value of the engine as specified by an engine manufacturer;

wherein the Rated RPM is a maximum RPM of the propeller at the Rated Engine Power as specified by the engine manufacturer;

calculating an Observed Torque Multiplier using equation (D):

$$\text{Observed Torque Multiplier} = \quad (D)$$
$$\text{Observed Engine Power}/(\text{Observed RPM})^3$$

calculating a Torque Index using equation (E):

$$\text{Torque Index} = \quad (E)$$
$$(\text{a number in a range from 85 to 110}) * (\text{Observed Torque Multiplier})/(\text{Reference Torque Multiplier})/(\text{Slip Factor})^2$$

comparing the Torque Index with an upper Torque Index threshold.

The step of outputting the Hull Cleaning Indicator comprises:

calculating a Slip Index using equation (F):

$$\text{Slip Index} = (\text{a number in a range from 85 to 110}) * (\text{Slip Factor})^3; \quad (F)$$

comparing the Slip Index with an upper Slip Index threshold.

Optionally, the step of outputting the Propeller Polishing Indicator further comprises: comparing the Torque Index with a lower Torque Index threshold and with an upper Torque Index threshold, and indicating that propeller polishing would be beneficial when the Torque Index exceeds the lower Torque Index threshold but not the upper Torque Index threshold, and indicating that propeller polishing is required when the Torque Index exceeds the upper Torque Index threshold. Optionally, the step of outputting the Hull Cleaning Indicator further comprises: comparing the Slip Index with a lower Slip Index threshold and with an upper Slip Index threshold, and indicating that hull cleaning would be beneficial when the Slip Index exceeds the lower Slip Index threshold but not the upper Slip Index threshold, and indicating that hull cleaning is required when the Slip Index exceeds the upper Slip Index threshold.

Optionally, the method further comprises adjusting at least the upper Slip Index threshold, and optionally the lower Slip Index threshold, over a time period starting when the vessel was last painted.

Optionally, the method further comprises resetting at least the upper Slip Index threshold, and optionally the lower Slip Index threshold when the vessel is painted.

Optionally, the step of calculating the Slip Index comprises calculating a rolling average of the Slip Index over a period of time, optionally at least 15 days, more preferably 30 days.

Optionally, the step of calculating the Torque Index comprises calculating a rolling average of the Torque Index over a period of time, optionally at least 15 days, more preferably 30 days.

This improvement can be realized without the need for additional hardware, or for the need to send data for specialist interpretation. Results can be obtained by embedding the process in existing dashboards, or the process can be run in a simple stand alone spreadsheet. Data sources can encompass simple Noon reports, or high frequency automated data.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF THE INVENTION

Figure 1:
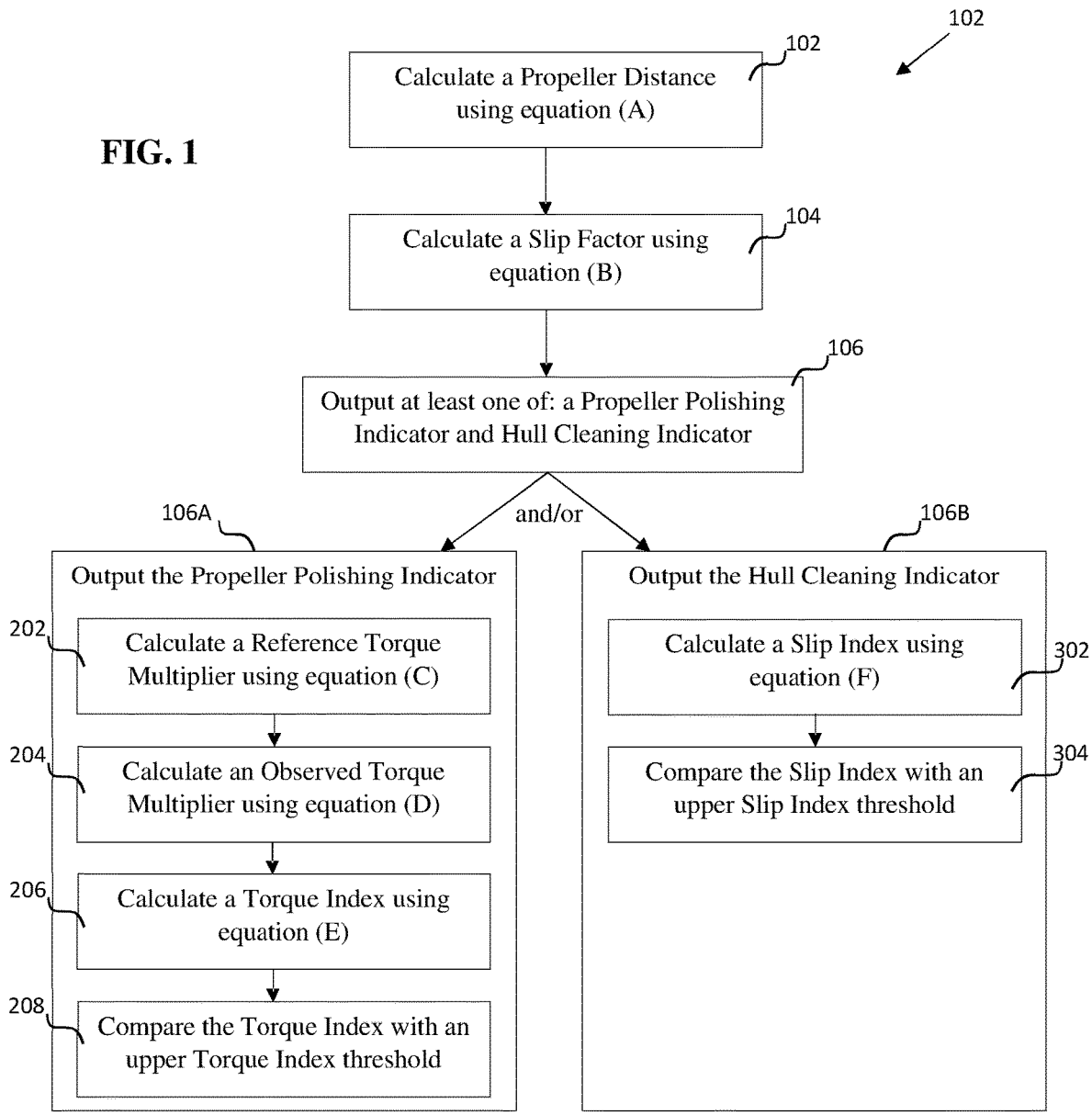
FIG. 1 shows a flow diagram of an embodiment of the invention.

The method described herein may advantageously distinguish between the influences of the propeller and hull in the overall performance loss determined from speed loss as described in ISO 19030 or similar calculations. The methods described herein enable individual assessment of propeller performance and hull performance, which allows for individual assessment of hull condition and propeller condition independent of one another. This in turn allows maintenance activities to be tailored to the actual need.

The method and system of the disclosure could reduce the overall fuel consumption of a fleet with at least 1 or 2% overall. Herein, where a large population of vessels would typically exceed the ideal value of average fuel consumption with about 9%, the method and system of the present disclosure can reduce excess fuel consumption on average across a fleet with about 2%, probably more in practice. Further, the various embodiments of the present invention can be implemented via computer-executable instructions, various elements of embodiments of the present invention are in essence the software code defining the operations of such various elements. Also, the embodiments of the present invention may be implemented in a controller or processor. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Terms used herein below may be defined as follows:

The term 'engine power' relates to the engine power transferred to the drive shaft (expressed in, for instance, horsepower or kW).

The term 'HRI' means Hull Resistance Index, which has its ordinary meaning as known to one of ordinary skill. In general, this metric uses ship performance data, which also may be referred to as operational data ("Noon data" as known to one of ordinary skill) as input and compares the power and speed of a respective vessel with a "virtual curve" having a cubic form based on reference speeds for Laden and Ballast conditions in relation to engine power. Sister vessels are given the same reference values so that the relative performance of different coatings and/or other in-dock treatments can be quantified. Overall figures are generated for individual coating cycles in an attempt to quantify the relative performance of different coatings over a life-cycle, for instance for 2.5- and 5-year cycles. The baseline value of 100 represents the expected performance of a new coating fresh from refit, with higher values approximating the percentage power increase required to compensate for deterioration in performance and attain a given speed.

The term 'lower Slip Index threshold' is a predetermined value that indicates a level above which it would be beneficial to perform hull cleaning, as determined by a user. This value is preferably adjusted upward over a period of time that elapses to reflect likely deteriorating condition of the hull, such as due to increased fouling. One of ordinary skill can select this value, such as based on historical data of when hull cleaning and/or painting was beneficial. For instance, the methods described herein may be applied to historical operational data to create historical Slip Index values that can be correlated to actual propeller condition and polishing needs, from which a suitable lower Slip Index threshold may be selected. In an example, the value may be increased by the number of months since painting divided by 12. This value may be reset once the hull has been cleaned and/or painted.

The term 'lower Torque Index threshold' is a predetermined value that indicates a level above which it would be beneficial to perform propeller polishing, as determined by a user. This value is preferably adjusted upward over a period of time that elapses to reflect likely deteriorating condition of the propeller, such as due to increased fouling. One of ordinary skill can select this value, such as based on historical data of when propeller polishing was beneficial. For instance, the methods described herein may be applied to historical operational data to create historical Torque Index values that can be correlated to actual propeller condition and polishing needs, from which a suitable lower Torque Index threshold may be selected. This value may be reset once the propeller has been polished.

The term 'nautical mile' (Nm) has its ordinary meaning as known to one of ordinary skill, including a unit of measurement used in marine navigation, and for the definition of territorial waters. The nautical mile is defined as exactly 1852 meters.

The term 'Nominal Pitch' is a value indicating the pitch at 0.7 radius.

The term 'Observed Distance' is the observed distance or actual distance the vessel travels in actual conditions over a selected period of time, such as minutes, hours, days, etc. as applicable operational data is available. Applicable operational data typically includes, GPS tracking, or (optionally) distance through water as indicated by log systems. The term actual distance may herein be interchangeably used with observed distance.

The term 'Observed Engine Power' is the observed or actual engine power of the vessel over a selected period, particularly the period already selected for the operational data to which the methods described herein are applied. The selected time period can be minutes, hours, days, etc. as applicable operational data is available. Applicable operational data typically includes, GPS tracking, or (optionally) distance through water as indicated by log systems.

The term 'Observed RPM' relates to a value indicating revolutions per minute of the drive shaft over a selected period, particularly the period already selected for the operational data to which the methods described herein are applied. The selected time period can be minutes, hours, days, etc. as applicable operational data is available. Applicable operational data typically includes, GPS tracking, or (optionally) distance through water as indicated by log systems.

The term 'Observed Torque Multiplier' is calculated using equation (D):

$$\text{Observed Torque Multiplier} = \text{Observed Engine Power} / (\text{Observed RPM})^3 \quad (D)$$

Not intended to be bound by theory, it has been found that there is a correlation between the Observed Torque Multiplier value and the condition of the propeller where an increase in value indicates an increase in fouling (i.e., deteriorating propeller conditions).

The term 'pitch at 0.7 radius' has its ordinary meaning as known to one of ordinary skill and may be referred to as Nominal Pitch. Typically, each radius of the blade can have a different pitch. The pitch at 0.7 radius is often used as a representative value indicating the nominal pitch for when the propeller is in use (i.e., moving through water). The pitch at 0.7 radius value can be provided by the manufacturer.

The term 'propeller' generally relates to a submerged device, with a rotating hub and radiating blades that are set at a pitch, which when rotated, exerts linear thrust to propel the vessel through water. Most marine propellers are screw propellers, with helical blades rotating on a drive shaft.

The term 'Propeller Distance' is calculated using the following equation (A):

$$\text{Propeller Distance} = (\text{Nominal Pitch}) * (\text{a number of less than 1, preferably in a range of 0.7 to 0.99}) * (\text{Observed RPM}). \quad (A)$$

The term 'propeller pitch" has its ordinary meaning as known to one of ordinary skill, including the distance the propeller theoretically advances in one rotation if it were moving through a soft solid (that is, if there were no slip).

The term 'propeller polishing' refers to any type of cleaning method that can be applied to the propellor below the water line. Typically, this includes, but is not limited to, physically polishing.

The term 'Rated Engine Power' has its ordinary meaning, including the maximum power output of the engine as specified by an engine manufacturer.

The term 'Rated RPM' has its ordinary meaning, including the maximum RPM of the propeller at the Rated Engine Power as specified by the engine manufacturer The term 'Reference Torque Multiplier' is calculated using equation (C):

$$\text{Reference Torque Multiplier} = \quad (C)$$
$$(\text{a number of less than 1, preferably in a range from 0.8 and up to 0.99}) * (\text{Rated Engine Power}) / (\text{Rated RPM})^3$$

The Reference Torque Multiplier is not a measure generally used in propeller calculations. Not intended to be bound by theories, it has been found that an increase in this value indicate an increase in propeller torque due to an increase in the propeller surface roughness. The Reference Torque Multiplier is derived using reference information. The Reference Torque Multiplier is different from the term "propeller torque co-efficient kQ," which has a specific design value that does not change and thus does not indicate any changes to propeller torque.

The term 'RPM' has its ordinary meaning and relates to rotational speed expressed in rotations or revolutions per minute. This rotational speed typically relates to the rotation of the shaft and the propeller.

The term 'shaft' refers to a drive shaft (alternatively referred to as propellor shaft) or similar mechanical connection between the engine and the propeller.

The term 'Slip Factor' is calculated using equation (B):

$$\text{Slip Factor} = (\text{Propeller Distance}) / (\text{Observed Distance}). \quad (B)$$

The Slip Factor is a relative measure of propeller slip through the water

The term 'Slip Index' (which also may be referred to as "propeller Slip Index") is calculated using equation (F):

$$\text{Slip Index} = (\text{a number in a range from 85 to 110}) * (\text{Slip Factor})^3; \quad (F)$$

The term 'torque' refers to the torque [for instance expressed in Nm] transferred by the engine to the shaft.

The term 'Torque Index' (which also may be referred to as "engine/drive shaft/propeller Torque Index") is calculated using equation (E):

$$\text{Torque Index} = \quad (E)$$
$$(\text{a number in a range from 85 to 110}) * (\text{Observed Torque Multiplier}) / (\text{Reference Torque Multiplier}) / (\text{Slip Factor})^2$$

The term 'upper Slip Index threshold' is a predetermined value that indicates a level above which hull cleaning needs to be performed, as determined by a user. This value is preferably adjusted upward over a period of time that elapses to reflect likely deteriorating condition of the hull, such as due to increased fouling. One of ordinary skill can select this value, such as based on historical data of when hull cleaning and/or painting was beneficial. For instance, the methods described herein may be applied to historical operational data to create historical Slip Index values that can be correlated to actual propeller condition and polishing needs, from which a suitable upper Slip Index threshold may be selected. In an example, the value may be increased by the number of months since painting divided by 12. This value may be reset once the hull has been cleaned and/or painted.

The term 'upper Torque Index threshold' is a predetermined value that indicates a level above which propeller polishing is needed, as determined by a user. This value is preferably adjusted upward over a period of time that elapses to reflect likely deteriorating condition of the propeller, such as due to increased fouling. One of ordinary skill can select this value, such as based on historical data of when propeller polishing was beneficial. For instance, the methods described herein may be applied to historical operational data to create historical Torque Index values that can be correlated to actual propeller condition and polishing needs, from which a suitable upper Torque Index threshold may be selected. This value may be reset once the propeller has been polished.

The translation of shaft power to speed in a ship is comprised of two steps:
the conversion of torque and RPM to produce thrust;
the use of thrust to produce speed.

The first step is determined largely by propeller performance, and the second principally by hull performance, though inevitably there is a little propeller influence in hull performance, and significant hull influence in propeller performance.

In general, propeller slip is the difference between the actual distance the propeller travels forward through the water (Propeller Distance) versus the distance it should theoretically travel without any slip (propeller pitch). For example, a propeller with a 21-inch pitch would theoretically travel 21 inches with one revolution through a soft solid (such as a screw turning into a piece of wood). However, when moving through water, there will be a certain amount of slip, where the propeller travels less than the theoretical value. As noted, propeller polishing (which can include painting or repainting) can help reduce slippage (and hence improves performance that leads to a reduction in fuel consumption) due to deteriorating conditions of the propeller. However, performance of propeller polishing prematurely before such polishing is warranted or needed would not reduce slippage and incurs additional costs with minimal performance improvements and fuel reduction. As noted above, this is similar for hull cleaning. Moreover, due to the difference in costs associated with each of the services: hull cleaning and propeller polishing, it is beneficial to know when each service is needed or warranted rather than performing both together regardless.

The methods described herein enable for determining whether a hull cleaning is needed or warranted, and separately whether a propeller polishing is warranted or needed, or both, which allow for the benefits disclosed herein to be fully realized. Moreover, the methods described herein can reliably determine the hull cleaning indicator or propeller polishing indicator based on (i) operational data comprising observed distance travelled over the selected period (Observed Distance), observed engine power during the selected period (Observed Engine Power), and observed revolutions per minute during the selected period (Observed RPM); and (ii) reference information of the vessel, wherein the reference information comprises a propeller pitch @ 0.7 R value for the propeller of the vessel (Propeller Pitch @ 0.7 R), a rated engine power value for the engine for the vessel (Rated Engine Power), and a rated revolutions per minute value for the propeller of the vessel (Rated RMP). Both such operational data and reference information are readily available without need for complex data acquisition, storage, and/or analysis sets (which can require additional equipment and/or involvement of third parties) or additional equipment (such as sensors) to obtain hull and propeller conditions.

FIG. 1 depicts a set of steps 100 to output an indicator for hull cleaning and/or propeller polishing, wherein each indicator output can be determined independent of one another. As shown in FIG. 1, step 102 involves calculating a Propeller Distance using equation (A):

$$\text{Propeller Distance} = (\text{Nominal Pitch}) * (\text{a number of less than 1,} \quad (A)$$
$$\text{preferably in a range of 0.7 to 0.99}) * (\text{Observed RPM}).$$

The Observed RPM is a value indicating revolutions per minute of the drive shaft over a selected period, such as 24 hours if Noon data is used, or shorter or longer time period depending on the particular operational data.

Step 104 involves calculating a Slip Factor using equation (B):

$$\text{Slip Factor} = (\text{Propeller Distance})/(\text{Observed Distance}). \quad (B)$$

The Observed Distance is an observed distance travelled by the vessel over the same selected period as that used in equation (A)

Step 106 involves outputting at least one of: a Propeller Polishing Indicator and Hull Cleaning Indicator. As can be seen the Propeller Polishing Indicator can be calculated and outputted separate from the Hull Cleaning Indicator. As such, a user can choose to output just the Propeller Polishing Indicator or just the Hull Cleaning Indicator or both. Further, with these values being provided separately by the methods and systems described herein, a user can be informed of whether just the hull needs cleaning or just the propeller needs polishing or both. For instance, the Propeller Polishing Indicator may be below the upper Slip Index threshold and the Hull Cleaning Indicator may be above the upper Torque Index threshold. Such outputs inform a user that only the hull should be cleaned, thereby saving costs associated with likely unnecessary propeller polishing.

As can be seen in FIG. 1, step 106A of outputting the Propeller Polishing Indicator comprises steps 202-208. Step 202 involves calculating a Reference Torque Multiplier using equation (C):

$$\text{Reference Torque Multiplier} = \quad (C)$$
$$(\text{a number of less than 1, preferably in a range from}$$
$$0.8 \text{ and up to } 0.99) * (\text{Rated Engine Power})/(\text{Rated RPM})^3$$

Step 204 involves calculating an Observed Torque Multiplier using equation (D)

$$\text{Observed Torque Multiplier} = \quad (D)$$
$$\text{Observed Engine Power}/(\text{Observed RPM})^3$$

Step 206 involves calculating a Torque Index using equation (E):

$$\text{Torque Index} = \quad (E)$$
$$(\text{a number in a range from 85 to 110}) * (\text{Observed Torque Multiplier})/$$
$$(\text{Reference Torque Multiplier})/(\text{Slip Factor})^2$$

Step 208 involves comparing the Torque Index with an upper Torque Index threshold.

As can be seen in FIG. 1, step 106B of outputting the Hull Cleaning Indicator comprises steps 302-304. Step 302 involves calculating a Slip Index using equation (F):

$$\text{Slip Index} = (\text{a number in a range from 85 to 110}) * (\text{Slip Factor})^3; \quad (F)$$

Step 304 involves comparing the Slip Index with an upper Slip Index threshold.

The step of calculating the Slip Index may advantageously comprise calculating a rolling average of the Slip Index. Calculating such rolling average of the Slip Index may comprise:
  averaging the Slip Index values over a time period (typically the last 60 days) starting at the last refit (maintenance) of the vessel, and resetting the rolling period when a maintenance intervention has occurred.
  Grading the average Slip Index for a period comprises:
  Green, below the lower Slip Index threshold;
  Amber, above the lower Slip Index threshold, but below the upper slip index threshold;
  Red, above the upper Slip Index threshold.

The step of calculating the Torque Index may advantageously comprise calculating a rolling average of the Torque Index. Calculating such rolling average of the Torque Index may comprise:

averaging the Torque Index values over a time period (typically the last 60 days), starting at the last refit (maintenance) of the vessel, and resetting the rolling period when a maintenance intervention has occurred.

Grading of the average Torque Index for a period comprises:
Green, below the lower Torque Index threshold;
Amber, above the lower Torque Index threshold, but below the upper Torque Index threshold;
Red, above the upper Torque Index threshold.

The output can then be used for two purposes:
1. In the short-term hull cleaning or propeller polishing can be targeted when it will produce the greatest benefit for a specific vessel;
2. In the longer term, coating selection and propeller polishing strategies can be developed based on actual data.

Either way, a reduction of fuel consumption can be achieved for any given vessel, thereby reducing both cost and emissions.

One of the advantages of the method and system of the present disclosure is that the methodology can be applied a broad range of types of operational or performance data, particularly those with different collection points. Exemplary types of operational or performance data includes Noon data, which is collected once a day (daily), and data that is collected more frequently, such as once an hour (hourly), every 15 minutes, and/or real time data. For example, if the methods and systems described herein is applied to Noon data, the selected time period for calculating or being applied to observed values would be 24 hours. If the type of operational data input is collected hourly then the selected time period can be 1 hour. It is understood one of ordinary skill can select the suitable time period, preferably selecting a period where the engine power and RPM remain relatively constant.

Once either Slip Index and/or Torque Index is in AMBER (i.e. exceeds the respective lower threshold value), the operator is advised to consider opportunities to mitigate. Once into the RED (i.e. exceeding the respective upper threshold value), the operator is advised to actively seek opportunities to mitigate.

For the analysis in accordance with the present disclosure, a rolling average of one or more performance indicators over a selected time period is generated and plotted alongside the performance graphs. The time period for averaging the data is, typically in the order of 15 to 90 days, for instance 60 days. Where 60-day average is mentioned, other time periods can provide good results as well. When the system uses real-time input from sensors onboard the vessel periods can be shortened. However, to allow for weather influences, a time period of at least a couple of days is preferred.

The rolling average is reset after events such as propeller polishing or hull cleaning. This prevents any improvements to be masked by the larger number of readings from prior to the intervention.

Figure 2:
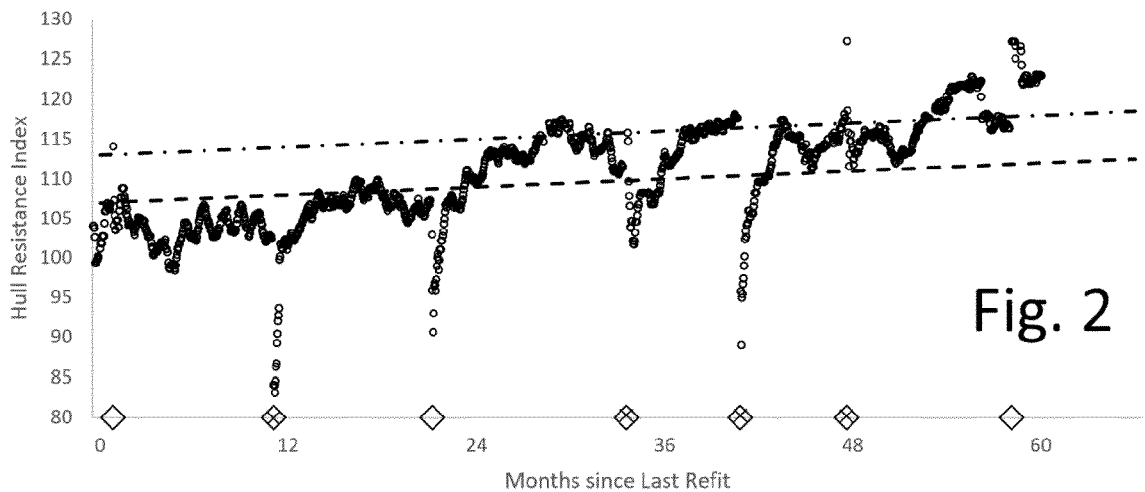
FIG. 2 shows a comparative diagram indicating exemplary HRI data of a vessel over time since a last refit (maintenance)
Figure 3:
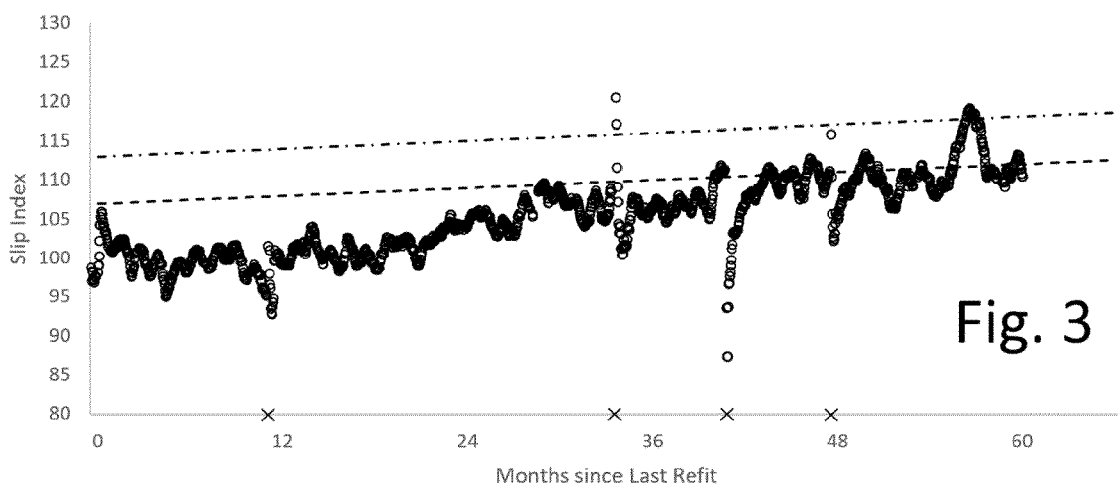
FIG. 3 shows a diagram indicating exemplary Slip Index data (based on operational noon data) of the vessel over time since a last refit.
Figure 4:
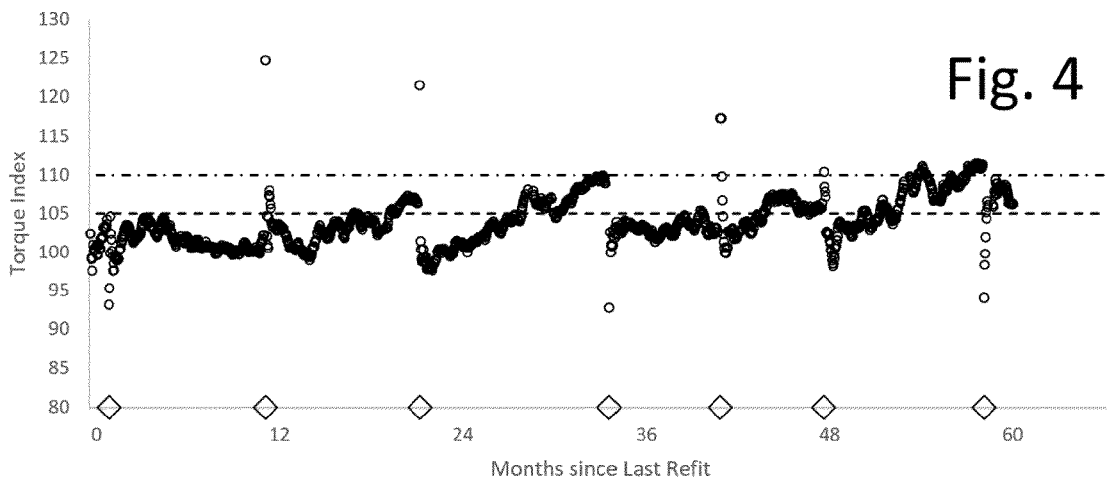
FIG. 4 shows a diagram indicating exemplary Torque Index (based on operational noon data) of the vessel over time since a last refit.

Shown in FIGS. 2 to 4, the three metrics of average HRI, Slip Index, and Torque Index and are respectively plotted over a 60-months time period since the last refit (maintenance) of the vessel. The respective indices are plotted on the vertical axis, time is plotted on the horizontal axis. Time starts Each data point represents a 60-day rolling average. Values are not subject to any filtration, e.g. to compensate for weather. Also plotted in the respective graphs are the respective lower thresholds (dashed lines) and upper thresholds (dot-dashed lines). Diamond and cross symbols on the horizontal axis represent invention markers which indicate intervention dates and types. Interventions can comprise hull cleaning (crosses), propellor polishing (diamonds), or both (cross-filled diamonds), as will be clarified below.

Hull Resistance Index (HRI), plotted in FIG. 2, is not required to implement the method and system of the present disclosure but it provides a useful comparative reference. HRI is generally used by the shipping industry to indicate hull resistance. The change in HRI values after interventions can be seen quite clearly on the second, third, fourth, fifth, and sixth intervention markers on the horizonal axis.

The cross symbols in FIG. 3 indicate hull cleaning interventions have been applied. It can be seen that the first and second hull cleaning interventions did not result in significant improvement (lowering) of the Slip Index, indicating the money was arguably not well-spent. Notably, the Slip Indices did not exceed the lower Slip Index thresholds. The third, and fourth hull cleaning did produce improvements (for a relatively short amount of time) which are evidenced by a discrete downward "jump" in the Slip Index. As can be seen in FIG. 3, in these latter cases the Slip Index started to exceed the lower Slip Index threshold (indicated by the dashed line) prior to the intervention of hull cleaning, whereas in the first two instances this was not the case.

The diamond symbols in FIG. 4 indicate propeller polishing interventions have taken place more frequently. It can be seen that the first, third, fourth, sixth, and seventh polishes resulted in a noticeable improvement in Torque Index. The second polishing was not effective to reduce Torque Index and indeed the Torque Index value prior to the polishing was not yet close to the lower Torque Index threshold. The polishing induced improvements were lost over three to six months after polishing.

The developed analysis tools have been tested on more than 20 vessels.

|  | 60-day average of HRI Index | 60-day average of Slip Index | 60-day average of Torque Index | Outcome (prop. or hull) |
|---|---|---|---|---|
| Vessel 1 3 months | 120 | 120 | 110 | Prop and hull |
| Vessel 2 22 months | 108 | 103 | 108 | Prop |
| Vessel 2 30 months | 112 | 110 | 107 | Prop and hull |
| Vessel 3 20 months | 112 | 106 | 110 | Prop |
| Vessel 4 46 months | 117 | 113 | 105 | Prop and hull |
| Vessel 5 33 months | 120 | 115 | 107 | Prop and hull |

According to the method of the present disclosure, if only the torque index exceeds a certain threshold, then propeller polishing is probably sufficient. If only the slip index is raised, or if both the torque and slip are raised, hull cleaning is advisable. If the hull will be cleaned, it will generally be advantageous to also polish the propeller at the same time.

A key objective of this disclosure is to produce tools that are useful to operational teams in decision making around whether a particular vessel would benefit from an intervention, and also whether that intervention should be a propeller polish or a hull clean, or both.

Underwater work has been identified as a high-risk activity, and so is subject to a rigorous permit to work system. The costs of mobilizing a dive team are significant, and the ship requires time off hire in a suitable port, hence there is considerable benefit in being able to accurately target the timing and extent of any underwater activity.

The use of rolling data means reports can be up to date at any time. The system and method of the disclosure can be included in dashboards, and allow a selection of graphical options. Individual reports can be generated. Tests have validated the predicted fuel savings, which can be up to about 8 to 10%. The system and method provide a better insight in to hull and propeller condition separately and allow more informed targeting of underwater interventions and more informed assessment of coatings. Overall, the system allows to predict intervention requirements.

The algorithms can be embedded into existing dashboards to provide a real time indication of performance. An example is when a vessel has a prolonged period at anchor, for instance when vessels are used as floating storage, potentially resulting in some degree of fouling.

The methods described herein may be implemented on any suitable system. Usually, a processor or controller executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C−, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used. Further, in at least one embodiment, the tool may be implemented using VBA Excel.

This improvement can be realized without the need for additional hardware, or for the need to send data for specialist interpretation. Results can be obtained by embedding the process in existing dashboards, or the process can be run in a simple stand alone spreadsheet. Data sources can encompass simple Noon reports, or high frequency automated data.

Any natural improvement in performance due to the vessel moving through the water can be tracked, and greater insight can be gained into the expected degree of improvement without intervention. Any intervention required can be planned in advance and targeted specifically to hull, or propeller, or both. The invention does not require any additional hardware or data gathering software. It can be applied to manual Noon readings and is also suitable for incorporation into high frequency data systems.

The present disclosure is not limited to the embodiments as described above and the appended claims. Many modifications are conceivable within the scope of the appended claims. Features of respective embodiments may be combined.

We claim:

1. A computer-implemented method for diagnosing maintenance needs of a sea-going vessel, said vessel comprising a hull, a propeller, an engine, and a drive shaft connecting the engine to the propeller, the method comprising the steps of:

(a) calculating a Propeller Distance using equation (A):

$$\text{Propeller Distance} = \text{(Nominal Pitch)} * \text{(a number of less than 1)} * \text{(Observed RPM)} \quad (A)$$

wherein the Nominal Pitch is a value indicating a pitch at 0.7 radius;

wherein the Observed RPM is a value indicating revolutions per minute of the drive shaft over a selected period;

(b) calculating a Slip Factor using equation (B):

$$\text{Slip Factor} = \text{(Propeller Distance)}/\text{(Observed Distance)} \quad (B)$$

wherein the Observed Distance is an observed distance travelled by the vessel over the selected period;

(c) outputting at least one of: a Propeller Polishing Indicator and Hull Cleaning Indicator, wherein outputting the Propeller Polishing Indicator comprises:

calculating a Reference Torque Multiplier using equation (C):

$$\text{Reference Torque Multiplier} = \text{(a number of less than 1)} * \text{(Rated Engine Power)} / \text{(Rated RPM)}^3 \quad (C)$$

wherein the Rated Engine Power is a maximum power output value of the engine as specified by an engine manufacturer;

wherein the Rated RPM is a maximum RPM of the propeller at the Rated Engine Power as specified by the engine manufacturer;

calculating an Observed Torque Multiplier using equation (D):

$$\text{Observed Torque Multiplier} = \text{Observed Engine Power}/(\text{Observed RPM})^3 \quad (D)$$

wherein the Observed Engine Power is an observed engine power of the vessel over the selected period;
calculating a Torque Index using equation (E):

$$\text{Torque Index} = \quad (E)$$
$$(\text{a number in a range from 85 to 110}) * (\text{Observed Torque Multiplier})/$$
$$(\text{Reference Torque Multiplier})/(\text{Slip Factor})^2$$

comparing the Torque Index with an upper Torque Index threshold;
wherein outputting the Hull Cleaning Indicator comprises:
calculating a Slip Index using equation (F):

$$\text{Slip Index} = (\text{a number in a range from 85 to 110}) * (\text{Slip Factor})^3; \quad (F)$$

comparing the Slip Index with an upper Slip Index threshold
wherein—the step of outputting the Propeller Polishing Indicator further comprises: comparing the Torque Index with a lower Torque Index threshold and with an upper Torque Index threshold, and indicating that propeller polishing would be beneficial when the Torque Index exceeds the lower Torque Index threshold but not the upper Torque Index threshold, and indicating that propeller polishing is required when the Torque Index exceeds the upper Torque Index threshold; and wherein:—the step of outputting the Hull Cleaning Indicator further comprises: comparing the Slip Index with a lower Slip Index threshold and with an upper Slip Index threshold, and indicating that hull cleaning would be beneficial when the Slip Index exceeds the lower Slip Index threshold but not the upper Slip Index threshold, and indicating that hull cleaning is required when the Slip Index exceeds the upper Slip Index threshold.

2. The computer-implemented method of claim 1, further comprising:
adjusting at least the upper Slip Index threshold, and optionally the lower Slip Index threshold, over a time period starting when the vessel was last painted.

3. The computer-implemented method of claim 1, further comprising:
resetting at least the upper Slip Index threshold, and optionally the lower Slip Index threshold when the vessel is painted.

4. The computer-implemented method of claim 1, the step of calculating the Slip Index comprises calculating a rolling average of the Slip Index over a period of time.

5. The computer-implemented method of claim 1, wherein the step of calculating the Torque Index comprises calculating a rolling average of the Torque Index over a period of time.

6. Computer readable medium for diagnosing maintenance needs of a sea-going vessel, said vessel comprising a hull, a propeller, an engine, and a drive shaft connecting the engine to the propeller, the computer readable medium comprising instructions which, when the computer readable medium is executed by a computer, cause the computer to carry out steps of:

(a) calculating a Propeller Distance using equation (A):

$$\text{Propeller Distance} = \quad (A)$$
$$(\text{Nominal Pitch}) * (\text{a number of less than 1}) * (\text{Observed RPM})$$

wherein the Nominal Pitch is a value indicating a pitch at 0.7 radius;
wherein the Observed RPM is a value indicating revolutions per minute of the drive shaft over a selected period;

(b) calculating a Slip Factor using equation (B):

$$\text{Slip Factor} = (\text{Propeller Distance})/(\text{Observed Distance}) \quad (B)$$

wherein the Observed Distance is an observed distance travelled by the vessel over the selected period;

(c) outputting at least one of: a Propeller Polishing Indicator and Hull Cleaning Indicator,
wherein outputting the Propeller Polishing Indicator comprises:
calculating a Reference Torque Multiplier using equation (C):

$$\text{Reference Torque Multiplier} = \quad (C)$$
$$(\text{a number of less than 1}) * (\text{Rated Engine Power})/(\text{Rated RPM})^3$$

wherein the Rated Engine Power is a maximum power output value of the engine as specified by an engine manufacturer;
wherein the Rated RPM is a maximum RPM of the propeller at the Rated Engine Power as specified by the engine manufacturer;
calculating an Observed Torque Multiplier using equation (D):

$$\text{Observed Torque Multiplier} = \quad (D)$$
$$\text{Observed Engine Power}/(\text{Observed RPM})^3$$

calculating a Torque Index using equation (E):

$$\text{Torque Index} = \quad (E)$$
$$(\text{a number in a range from 85 to 110}) * (\text{Observed Torque Multiplier})/$$
$$(\text{Reference Torque Multiplier})/(\text{Slip Factor})^2$$

comparing the Torque Index with an upper Torque Index threshold;

wherein outputting the Hull Cleaning Indicator comprises:
calculating a Slip Index using equation (F):

$$\text{Slip Index} = (\text{a number in a range from 85 to 110}) * (\text{Slip Factor})^3; \quad (F)$$

comparing the Slip Index with an upper Slip Index threshold wherein—the step of outputting the Propeller Polishing Indicator further comprises: comparing the Torque Index with a lower Torque Index threshold and with an upper Torque Index threshold, and indicating that propeller polishing would be beneficial when the Torque Index exceeds the lower Torque Index threshold but not the upper Torque Index threshold, and indicating that propeller polishing is required when the Torque Index exceeds the upper Torque Index threshold; and wherein:—the step of outputting the Hull Cleaning Indicator further comprises: comparing the Slip Index with a lower Slip Index threshold and with an upper Slip Index threshold, and indicating that hull cleaning would be beneficial when the Slip Index exceeds the lower Slip Index threshold but not the upper Slip Index threshold, and indicating that hull cleaning is required when the Slip Index exceeds the upper Slip Index threshold.

7. The computer program of claim 6, wherein the step of calculating the Slip Index comprises calculating a rolling average of the Slip Index over a period of time.

8. The computer program of claim 6, wherein the step of calculating the Torque Index comprises calculating a rolling average of the Torque Index over a period of time.

9. A computer-readable medium for diagnosing maintenance needs of a sea-going vessel, said vessel comprising a hull, a propeller, an engine, and a drive shaft connecting the engine to the propeller, wherein the computer-readable medium comprises instructions which, when executed by a computer, cause the computer to carry out steps:
(a) calculating a Propeller Distance using equation (A):

$$\text{Propeller Distance} = \quad (A)$$
$$(\text{Nominal Pitch}) * (\text{a number of less than 1}) * (\text{Observed RPM})$$

wherein the Nominal Pitch is a value indicating a pitch at 0.7 radius;
wherein the Observed RPM is a value indicating revolutions per minute of the drive shaft over a selected period;
(b) calculating a Slip Factor using equation (B):

$$\text{Slip Factor} = (\text{Propeller Distance})/(\text{Observed Distance}) \quad (B)$$

wherein the Observed Distance is an observed distance travelled by the vessel over the selected period;
(c) outputting at least one of: a Propeller Polishing Indicator and Hull Cleaning Indicator,
wherein outputting the Propeller Polishing Indicator comprises:
calculating a Reference Torque Multiplier using equation (C):

$$\text{Reference Torque Multiplier} = \quad (C)$$
$$(\text{a number of less than 1}) * (\text{Rated Engine Power})/(\text{Rated RPM})^3$$

wherein the Rated Engine Power is a maximum power output value of the engine as specified by an engine manufacturer;
wherein the Rated RPM is a maximum RPM of the propeller at the Rated Engine Power as specified by the engine manufacturer;
calculating an Observed Torque Multiplier using equation (D):

$$\text{Observed Torque Multiplier} = \quad (D)$$
$$\text{Observed Engine Power}/(\text{Observed RPM})^3$$

calculating a Torque Index using equation (E):

$$\text{Torque Index} = \quad (E)$$
$$(\text{a number in a range from 85 to 110}) * (\text{Observed Torque Multiplier})/$$
$$(\text{Reference Torque Multiplier})/(\text{Slip Factor})^2$$

comparing the Torque Index with an upper Torque Index threshold:
wherein outputting the Hull Cleaning Indicator comprises:
calculating a Slip Index using equation (F):

$$\text{Slip Index} = (\text{a number in a range from 85 to 110}) * (\text{Slip Factor})^3; \quad (F)$$

comparing the Slip Index with an upper Slip Index threshold wherein—the step of outputting the Propeller Polishing Indicator further comprises: comparing the Torque Index with a lower Torque Index threshold and with an upper Torque Index threshold, and indicating that propeller polishing would be beneficial when the Torque Index exceeds the lower Torque Index threshold but not the upper Torque Index threshold, and indicating that propeller polishing is required when the Torque Index exceeds the upper Torque Index threshold; and wherein:—the step of outputting the Hull Cleaning Indicator further comprises: comparing the Slip Index with a lower Slip Index threshold and with an upper Slip Index threshold, and indicating that hull cleaning would be beneficial when the Slip Index exceeds the lower Slip Index threshold but not the upper Slip Index threshold, and indicating that hull cleaning is required when the Slip Index exceeds the upper Slip Index threshold.

10. The computer-readable medium of claim 9, wherein the step of calculating the Slip Index comprises calculating a rolling average of the Slip Index over a period of time.

11. The computer-readable medium of claim 9, wherein the step of calculating the Torque Index comprises calculating a rolling average of the Torque Index over a period of time.

\* \* \* \* \*